United States Patent [19]

Cupo et al.

[11] Patent Number: 5,163,066
[45] Date of Patent: Nov. 10, 1992

[54] SYNCHRONIZING THE OPERATION OF MULTIPLE EQUILIZERS IN A DIGITAL COMMUNICATIONS SYSTEM

[75] Inventors: Robert L. Cupo, Eatontown; Cecil W. Farrow, Highlands, both of N.J.

[73] Assignee: AT&T Bell Laboratories, Murray Hill, N.J.

[21] Appl. No.: 705,246

[22] Filed: May 24, 1991

[51] Int. Cl.⁵ .............................................. H03H 7/30
[52] U.S. Cl. ..................................... 375/14; 375/102
[58] Field of Search ................... 375/11, 12, 13, 14, 375/102; 364/724, 724.2; 333/18

[56] References Cited

U.S. PATENT DOCUMENTS

| | | | |
|---|---|---|---|
| 4,328,585 | 5/1982 | Monsen | 375/14 |
| 4,489,416 | 12/1984 | Stuart | 375/13 |
| 4,606,054 | 8/1986 | Amitay et al. | 375/14 |
| 4,817,114 | 3/1989 | Boer et al. | 375/13 |
| 4,821,289 | 4/1989 | Peile | 375/102 |

Primary Examiner—Stephen Chin
Attorney, Agent, or Firm—David R. Padnes

[57] ABSTRACT

In a dual-duplex system wherein the communications channels have associated propagation delays which are typically different from one another, equalizers are connected to operate upon the signal received from each channel. To synchronize the operation of these equalizers to each other, the coefficients of each equalizer are updated when the training sequence is received from at least one of the communications channels. The sequence of symbol values in the training sequence may either be known or unknown to the receiver prior to transmission. When this sequence is detected, the coefficient updating circuit for each equalizer operates in response to a common reference signal. This reference signal includes a plurality of symbols and the value of each symbol is supplied at the same time to each equalizer coefficient updating circuit. This technique generates coefficients which compensate for propagation delay differences between the communications channels and is applicable to communications systems wherein data is distributed and transmitted through a plurality of communications channels.

11 Claims, 3 Drawing Sheets

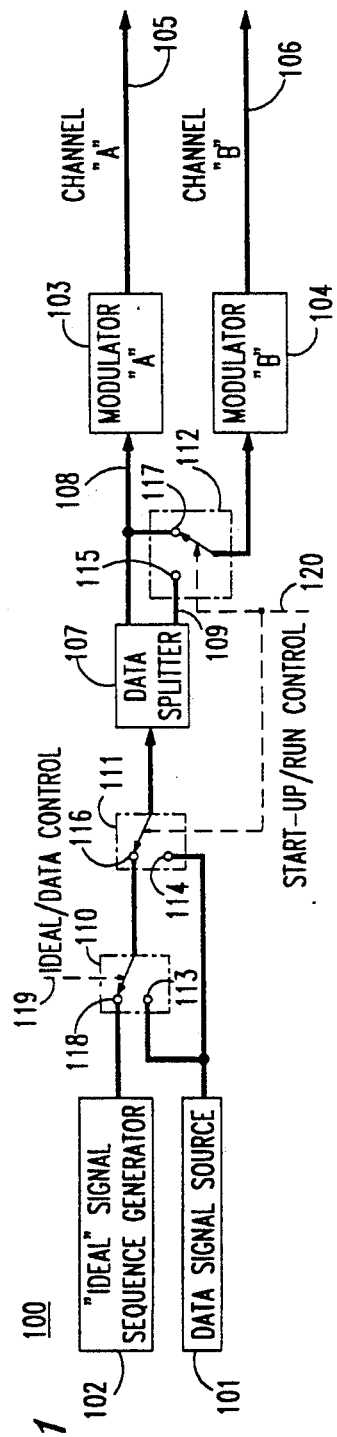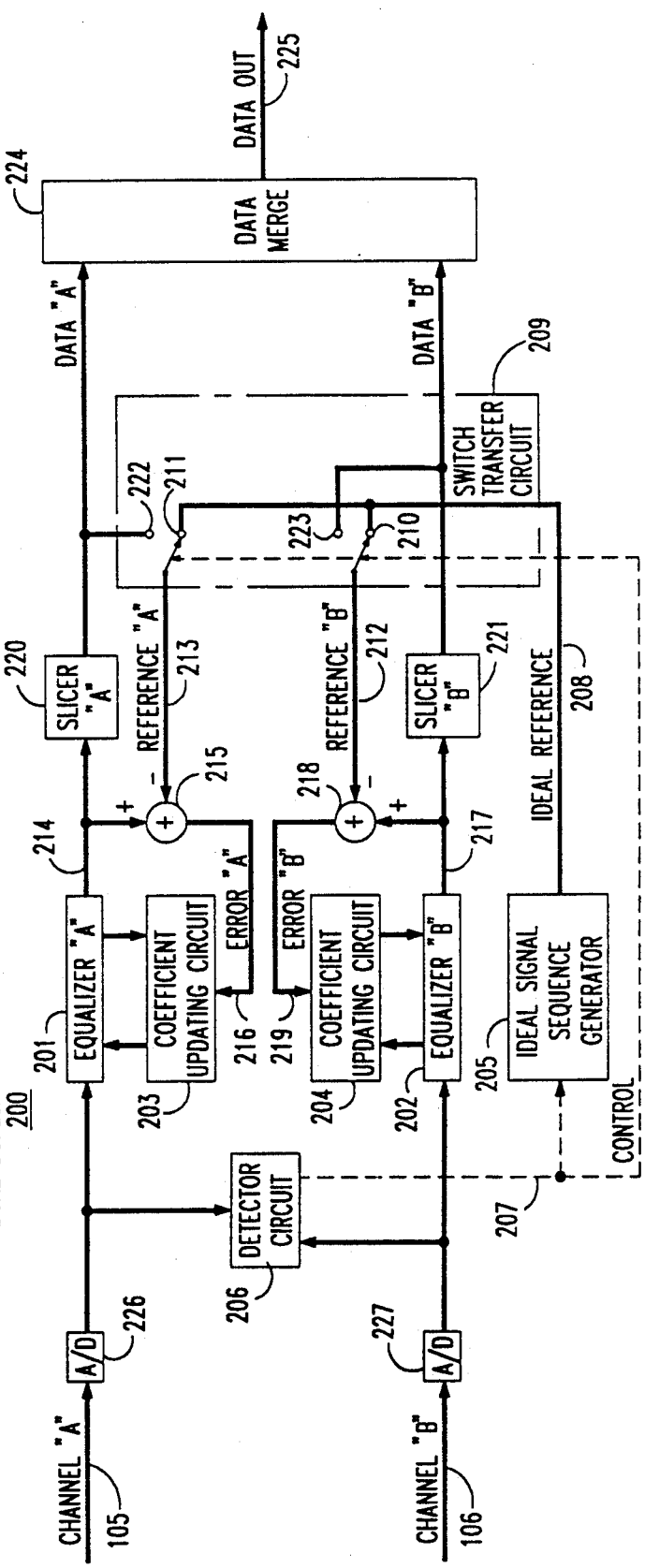

DUAL DUPLEX RECEIVER
300

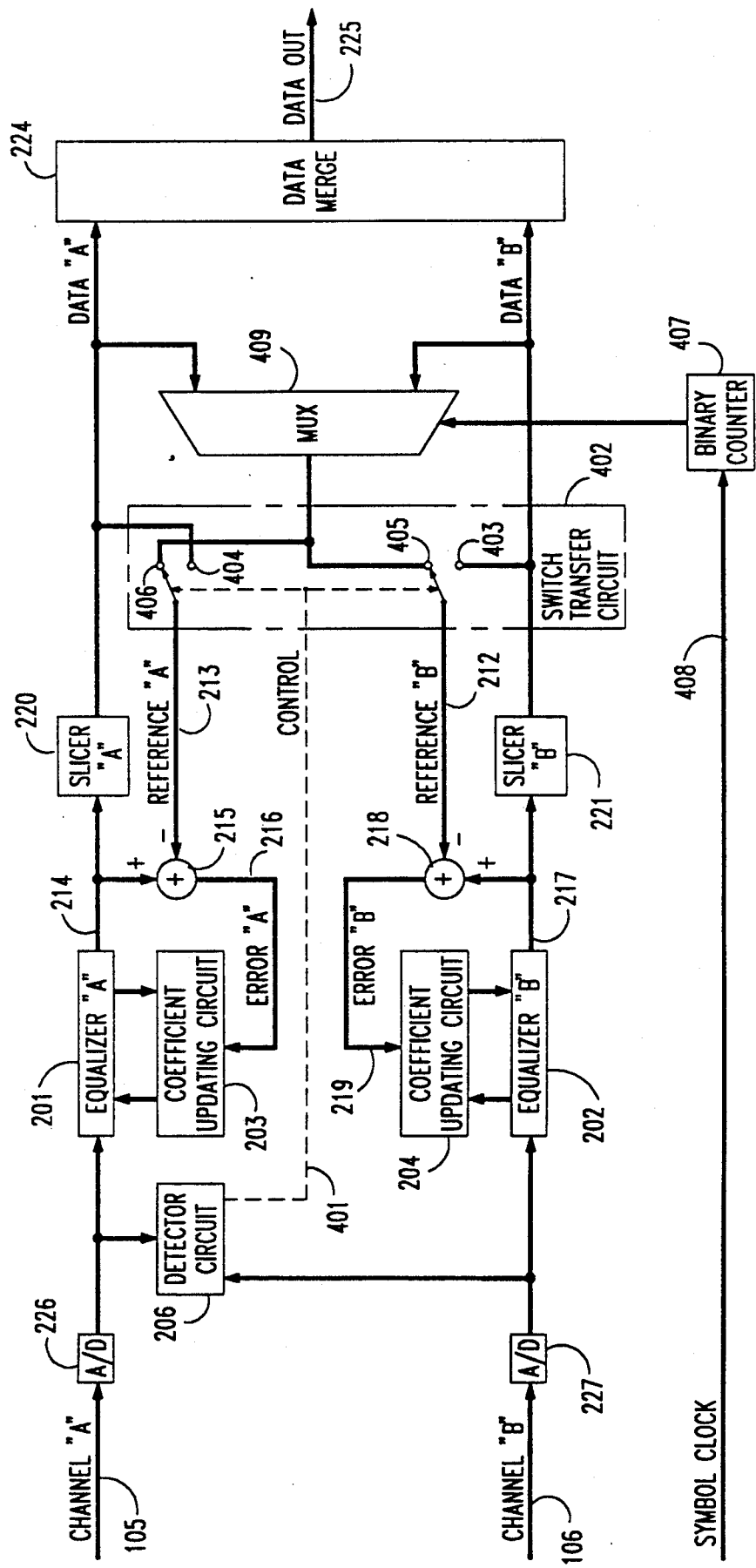

SYNCHRONIZING THE OPERATION OF MULTIPLE EQUILIZERS IN A DIGITAL COMMUNICATIONS SYSTEM

TECHNICAL FIELD

The present invention relates to digital communications systems and, more particularly, to a scheme for synchronzing the operation of equalizers to each other in a digital communications system wherein the digital information is communicated through a plurality of transmission channels.

BACKGROUND OF THE INVENTION

Digital communications systems are those in which the information or data communicated is represented by discrete symbols which may be directly transmitted or used to modulate a carrier signal. Synchronous digital transmission systems are those wherein the operation of the transmitter and receiver must be synchronized to one another to accurately recover the transmitted data.

A variety of architectures are used for synchronous digital communications systems. One such architecture is the so-called dual-duplex architecture. In a duplex system, the data is transmitted at some predetermined rate over a communications channel in two directions. Each duplex communications channel includes a transmitter and receiver circuitry along with a communications signal path therebetween. This communications signal path can take a variety of forms, such as wire, optical fiber, or air. Within each receiver, an equalizer is typically employed to compensate for the distortion present in the incoming data. Such equalizers are generally automatic or adaptive and utilize coefficients which are periodically or continuously updated to track changes in the distortion with time.

In a dual-duplex architecture, the data at some predetermined rate is evenly divided over two bidirectional transmission channels, i.e., two communications signal paths, so that the data rate in each channel is one-half of the predetermined rate. The problem with such an architecture is that the propagation delay of each channel is generally different and this difference may vary with time. As a result, accurate recovery of the transmitted data is, in general, not possible unless this propagation delay difference is compensated for via some form of synchronization arrangement and such arrangement must initially synchronize the operation of the multiple equalizers.

Until recently, the provisioning of local subscriber loops, i.e., communications facilities connecting a customer's business or residential premises with a local central office in a public communications network for high-speed digital communications, required an engineering of each loop to meet error rate objectives. This engineering involved the removal of bridge taps and the installation of specifically spaced signal amplifiers or repeaters. In upcoming industry offerings for providing high-speed digital signals over subscriber loops, the need for such engineering has been eliminated. However, to meet the necessary signal cross-talk requirements, a dual-duplex architecture has been found to be the preferred system architecture. As previously discussed, the use of an architecture, in turn, requires that, for each direction of transmission, the transmission of data in each channel be synchronized to the other.

While a variety of digital signal synchronization techniques are known, each such arrangement possesses significant shortcommings and does not specifically address the problem of synchronizing the operation of multiple equalizers. In one class of known arrangements, for example, framing bits are periodically transmitted and detected to maintain synchronization. The use of such bits, however, reduces the date rate that would otherwise be available to the customer or increases the required channel bandwidth. In still another arrangement, such that disclosed in a pending U.S. patent application, Ser. No. 620,868, filed Nov. 30, 1990, by Werner and assigned to the present assignee, synchronization is maintained by modifying the modulation format that would otherwise be used so as to provide synchronization signals. While this scheme provides satisfactory results, the cost of the additional circuitry required does not meet the objectives of certain system applications.

Based on the foregoing, it would be extremely desirable if a synchronization arrangement which specifically address the problem of synchronizing the operation of multiple equalizers could be devised for digital communications systems which is easy to implement and would meet the cost objectives of a wide range of system applications.

SUMMARY OF THE INVENTION

The present invention addresses the problem of synchronizing the operation of multiple equalizers to one another in a digital communications system utilizing multiple transmission channels. In accordance with the present invention, in a dual-duplex system, an identical training sequence is transmitted at start-up through each of the transmission channels. The receiver circuitry connected to each such channel includes an adaptive equalizer, and the coefficients of these devices are adapted at start-up using a common reference signal sequence which includes a plurality of symbols. Each of these symbols is used at the same time by each equalizer to adapt its associated coefficients when the training sequence is received from at least one of the transmission channels. This use of each symbol at the same time to update equalizer coefficients for channels having different propagation delays overcomes the limitations of the prior art.

In the disclosed embodiments, the training sequence can include either an a priori known sequence of signals or actual data signals which are priorly unkown. In the case of the former, the common reference signal is this a priori known sequence which is supplied from a local source. In the case of the latter, the common reference signal supplied to both equalizers is derived from a signal supplied by one of the equalizers.

BRIEF DESCRIPTION OF THE DRAWING

FIG. 1 is a block-schematic diagram of an embodiment of a transmitter in accordance with the present invention;

FIG. 2 is a block-schematic diagram of an embodiment of a receiver in accordance with the present invention for use with a training sequence of a priori known symbols;

FIG. 4 is block-schematic diagram of a second embodiment of a receiver in accordance with the present invention for use with a training sequence of priorly unkown symbols.

DETAILED DESCRIPTION

Figure 3:
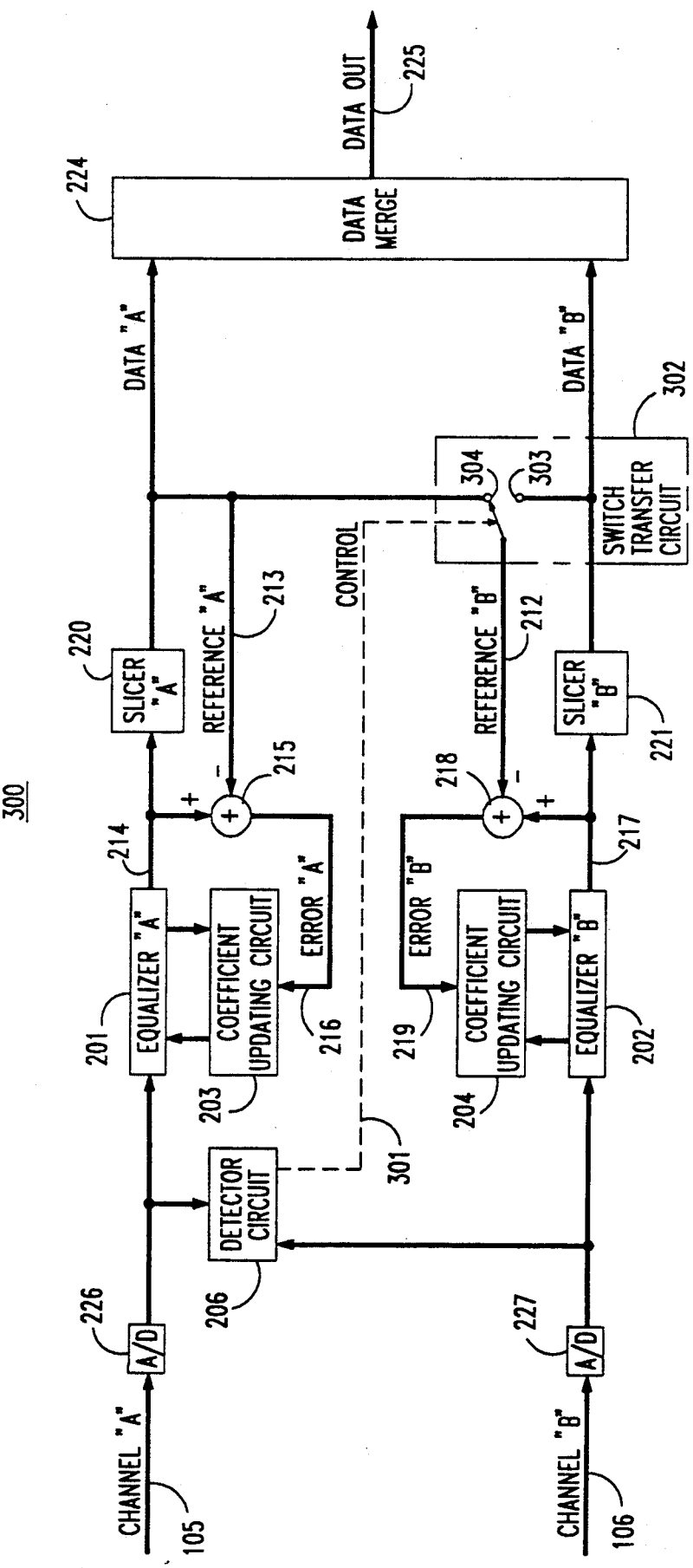
FIG. 3 is a block-schematic diagram of a first embodiment of a receiver in accordance with the present invention for use with a training sequence of priorly unkown symbols.

FIG. 1 shows an embodiment of a transmitter 100 pursuant to the present invention for use in a dual-duplex communications system. The overall function of transmitter 100 is to couple digital symbols from either data signal source 101 or "ideal" signal sequence generator 102 to modulators 103 and 104 wherein such symbols are prepared for transmission through channels 105 and 106, respectively. For purposes of convenience, one of the channels in the dual-duplex system is designated as "A" and the other as "B". In FIG. 1, channel 105 is the "A" channel while channel 106 is the "B" channel. To match this channel designation, modulators 103 and 104 are also designated as modulators "A" and "B", respectively. Regardless of the digital symbol source, the coupled symbols are supplied to data splitter 107 which supplies successively received symbols to leads 108 and 109 in alteration. As a result, the symbol rate on leads 108 and 109 is one-half that of the input to data splitter 107.

In accordance with the present invention, the coefficients of adaptive equalizers for each transmission channel in the illustrative dual-duplex communications system may be updated by transmitting a training sequence of either actual data symbols or "ideal" data symbols. With a training sequence of actual data symbols, the sequence of transmitted data symbol values is not priorly known at the receiver while the opposite is true for a training sequence of ideal data symbols. To provide this functionality, transmitter 100 incorporates several switches designated as ideal/data control switch 110, and start-up/run control switches 111 and 112. During the normal or "run" mode, i.e., after the operation of the receiver equalizers are synchronized to each other, the symbols transmitted are supplied from data signal source 101 and, as a result, ideal/data control switch 110 is toggled to terminal 113 and start-up/run control switches 111 and 112 are respectively toggled to terminals 114 and 115. At start-up or at such other predetermined times as may be desired to resynchronize the operation of the equalizers to one another, start-up/run control switches 111 and 112 are respectively toggled to terminals 116 and 117. In addition, ideal/data control switch 110 is either coupled to terminal 118 when, as will be discussed in reference to FIG. 2, the coefficients for the adaptive equalizers are adapted in response to receiving a training sequence of ideal data symbols or is coupled to terminal 113 when, as will be discussed in reference to FIGS. 3 and 4, such coefficients are adapted in response to receiving a training sequence of actual data symbols. The toggling of switch 110 between terminals 113 and 118 is controlled by the logic state of a control signal on lead 119 while the toggling of switch 111 between terminals 114 and 116 and switch 112 between terminals 115 and 117 is controlled by the logic state of another control signal on lead 120. It should be noted that in the star-up mode, the symbols on lead 108 are coupled to modulators 103 and 104 and the symbols on lead 109 are ignored. Consequently, regardless of whether the coefficients of the receiver equalizers are updated using data signal source 101 or ideal signal sequence generator 102, the same sequence of symbols is transmitted through channels 105 and 106. In addition, the symbol rate of such trasmitted symbols is one-half that generated by the data signal source or the ideal signal sequence generator.

FIG. 2 shows an embodiment of a receiver in accordance with the present invention for use in the illustrative dual-duplex system. In this illustrated embodiment, receiver 200 is configured to update the plurality of coefficients utilized by each of the equalizers 201 and 202 in response to receiving a training sequence of ideal symbols from channels 105 and 106 at start-up or at other predetermined times. Equalizers 201 and 202 respectively compensate for the distortion in channels 105 and 106 in well-known fashion. Since this distortion is time-varying, equalizers 201 amd 202 are adaptive, i.e., the values of their respective plurality of coefficients utilized to compensate for the channel distortion are adjusted over time to provide the appropriate compensation. In addition, in accordance with the present invention, the coefficient values are adapted in a manner which compensates for any difference in the propagation delay through channels 105 and 106. In this regard, it should be noted that each of channels 105 and 106 has an associated propagation delay and such delays are typically different from one another and each delay may vary with time.

The adaptive characteristic of equalizers 201 and 202 is respectively provided by coefficient updating circuits 203 and 204 which operate using any of a variety of well-known algorithms to provide the most appropriate coefficient values. While a variety of algorithms may be used, each of these algorithms illustratively uses an error signal which is the difference between the equalizer output signal and a reference signal. In FIG. 2, at start-up or at other predetermined times, this reference signal is supplied by ideal signal sequence generator 205 which provides a signal sequence identical to that outputted by data splitter 107 in FIG. 1 when such data splitter is provided with the output of ideal signal sequence generator 102 via the appropriate operation of switches 110 and 111.

To determine each time interval when ideal signal sequence generator is coupled to data splitter 107 and, hence, when the ideal symbols coupled to modulators 103 and 104 are transmitted through channels 105 and 106, receiver 200 employs detector circuit 206. Circuit 206 determines each such time interval by examining either the output of analog-to-digital (A/D) converter 226, the output of A/D converter 227 or the outputs of both of these converters. Such detection circuitry is well known and a number of circuits to provide this function may be utilized. When each such time interval is determined, detector circuit 206 provides a control signal on lead 207 which enables generator 205 to begin outputting ideal symbols on lead 208. The sequence of such symbols forms a receiver version of the ideal symbol sequence transmitted through channels 105 and 106. The control signal on lead 207 also causes switch transfer circuit 209 to toggle the double-pole double-throw switch therein to toggle to terminals 210 and 211 so as to couple the ideal symbol sequence on lead 208 to leads 212 and 213. As a result, each symbol in the ideal symbol sequence provided by generator 205 is simultaneously provided as a reference signal to update the coefficients of equalizers 201 and 202. Specifically, the value of each ideal symbol on lead 213 is subtracted from the equalizer 201 output on lead 214 via combiner 215 to form the error signal on lead 216. This error signal is coupled to coefficient updating circuit 203. In similar fashion, symbols identical and synchronized to those on lead 213 also appear on lead 212 and are algebraically substracted from the equalizer 202 output on lead 217 via combiner 218 to form the error signal coupled to coefficient update circuit 204. The synchronized supplying of ideal symbols to the coefficient updating circuits 203 and 204 synchronizes the operation of equalizers 201 and 202 to one another so as to compensate for propagation delay differences between channels 105 and 106.

At times when ideal symbols are not transmitted through channels 105 and 106, generator 205 is inoperative and switch transfer circuit 209 toggles slicers 220 and 221 to terminals 222 and 223 so as to couple the outputs thereof to combiners 215 and 218. Each slicer operates in well-known fashion to quantize each equalizer output value to the closest one of the permissible transmitted digital symbol values, and the updating of the coefficients of each equalizer in response to its output and the quantized equalizer output is also provided by coefficient updating circuit 203 and 204 and such technique is well known. Data merge 224 combines the outputs of slicers 220 and 221 to reconstruct on lead 225 the originally transmitted sequence of symbol values supplied by data signal source 101.

Refer now to FIG. 3 which shows a first embodiment of a receiver configured to update the coefficients of multiple equalizers in response to receiving a training sequence of actual data symbol values from data signal source 101 of FIG. 1. Receiver 300 includes much of the circuitry of receiver 200 and such circuitry operates in the same manner as in FIG. 2 and bears the same reference designation. The difference between FIGS. 2 and 3 is that the coefficient updating commences when detector circuit 206 detects a signal in either channel 105 or 106 for a predetermined time interval. Indeed, this capability can be provided by any of a variety of well-known energy detectors. When this condition is detected, circuit 206 generates a control signal on lead 301 which causes switch transfer circuit 302 to toggle from terminal 303 to terminal 304. As a result, the reference signals, designated as "A" and "B" and appearing on leads 213 and 212, respectively, is the output signal provided by slicer 220. Therefore, a signal derived from one equalizer, i.e., the quantized output of equalizer 201, is used to update the coefficients of both equalizers 201 and 202. This procedure synchronizes the operation of both these equalizers and creates coefficient values which compensate for any difference in propagation delay between channels 105 and 106. After a predetermined time interval sufficient to ensure that the operation of the equalizers are synchronized to one another, detector circuitry 206 couples a control signal which causes switch transfer circuit 302 to toggle to terminal 303. Now, the coefficient updating of equalizers 201 and 202 continues in conventional fashion with equalizers 201 and 202 being respectively updated using reference signals "A" and "B".

FIG. 4 shows a modification of the receiver 300 which provides a reference signal for updating the equalizer coefficients which is derived from the outputs of each equalizer in alternation. In receiver 400, as shown in FIG. 4, again much of the circuitry of FIG. 2 is utilized and such circuitry provides the same functionality and bears the same reference designations in both these drawing figures. Detector 206 again operates as described in reference to FIG. 3 and provides a control signal upon detecting a received signal in channel 105 or 106 for a predetermined time interval. This detected condition causes switch transfer circuit 402 to toggle from terminals 403 and 404 to terminals 405 and 406 where the output of multiplexer 409 provides reference signals "A" and "B" on leads 213 and 212. The operation of multiplexer 409 is controlled by binary counter 407 which changes its count in response to each symbol clock pulse on lead 408. On each count, multiplexer 409 couples the output signal of a different slicer to terminals 405 and 406. Accordingly, in the operation of receiver 400, the quantized outputs of equalizers 201 and 202 are used in alternation as the reference signal on leads 213 amd 212. After a predetermined time interval sufficient to ensure that the operation of the equalizers are synchronized to one another, detector circuitry 206 couples a control signal which causes switch transfer circuit 402 to toggle back to terminals 403 and 404. Consequently, the coefficients for equalizer 201 are now updated using the output of slicer 220 and the coefficients for equalizer 202 are now updated using the output of slicer 221.

It should, of course, be understood that while the present invention has been disclosed in reference to several embodiments, other arrangements should be apparent to those of ordinary skill in the art. First, for example, while the present invention has been disclosed in reference to a dual-duplex communications system, the invention is applicable to virtually any communications systems wherein data is distributed across a plurality of unidirectional or bidirectional communications channels. Second, while in FIG. 3, the quantized output of equalizer 201 was used as the reference signal for updating the coefficient values for equalizers 201 and 202, alternatively, the quantized output of slicer 221 could be used by rearranging the operation of switch transfer circuit 402. Lastly, while the embodiments of the present invention have been described in reference to discrete functional elements, the function of one or more of these elements can be provided by one or more appropriately programmed general-purpose processors, or special-purpose integrated circuits, or digital signal processors, or an analog or hybrid counterpart of any of these devices.

We claim:

1. Apparatus for use in a digital communications system wherein signals are received from each of a plurality of communications channels, each communications channel having a propagation delay which is typically different from that of the other communications channels, said apparatus comprising adaptive equalizer means for forming equalized signals, each equalized signal corresponding to the signal received from a different one of said plurality of communications channels and being formed using a set of coefficient values, each set of coefficient values being associated with a different one of said communications channels, said adaptive equalizer means updating each set of coefficient values using a common reference signal sequence upon detection of a predetermined condition; said reference signal sequence comprising a plurality of symbols and each of these symbols being used at the same time to update each set of coefficients; and means for detecting said predetermined condition in response to an examination of signals received from at least one of said communications channels.

2. The apparatus of claim 1 wherein each set of coefficient values includes a plurality of coefficient values.

3. The apparatus of claim 1 wherein said communications system is a dual-duplex system and said plurality of communications channels is two communications channels.

4. The apparatus of claim 1 wherein said predetermined condition is receiving a signal in at least one communications channel for a predetermined time period.

5. The apparatus of claim 4 wherein said signal constituting said predetermined condition has a value which is a priori known to said detecting means.

6. The apparatus of claim 4 wherein said signal constituting said predetermined condition has a value which is not priorly known to said detecting means.

7. The apparatus of claim 1 further including means for supplying said common reference signal sequence to said adaptive equalizer means when said predetermined condition is detected.

8. The apparatus of claim 7 wherein said common reference signal supplied by said supplying means is a signal derived from one equalized signal.

9. The apparatus of claim 7 wherein said common reference signal supplied by said supplying means is provided by a signal source.

10. A method for use in a digital communications system wherein signals are received from each of a plurality of communications channels, each communications channel having a propagation delay which is typically different from that of the other communications channels, said method comprising the steps of
   detecting a predetermined condition in response to an examination of signals received from at least one of said communications channels; and
   forming equalized signals, each equalized signal corresponding to the signal received from a different one of said plurality of communications channels and being formed using an associated set of coefficient values, each set of coefficient values being associated with a different one of said communications, channels, each set of coefficient values being updated using a common reference signal sequence upon detection of said predetermined condition; said reference signal sequence comprising a plurality of symbols and each of these symbols being used at the same time to update each set of coefficients.

11. A receiver for use in a digital communications systems wherein signals are received from each of a plurality of communications channels, each communications channel having a propagation delay which is typically different from that of the other communications channels, said apparatus comprising
   adaptive equalizer means for forming equalized signals, each equalized signal corresponding to the signal received from a different one of said plurality of communications channels and being formed using a set of coefficient values, each set of coefficient values being associated with a different one of said communications channels, said adaptive equalizer means updating each set of coefficient values using a common reference signal sequence upon detection of a predetermined condition; said reference signal sequence comprising a plurality of symbols and each of these symbols being used at the same time to update each set of coefficients;
   means for detecting said predetermined condition in response to an examination of signals received from at least one of said communications channels; and
   means for receiving the equalized signal associated with each communications channel and outputting these equalized signals in an ordered sequence.

* * * * *